2,974,501

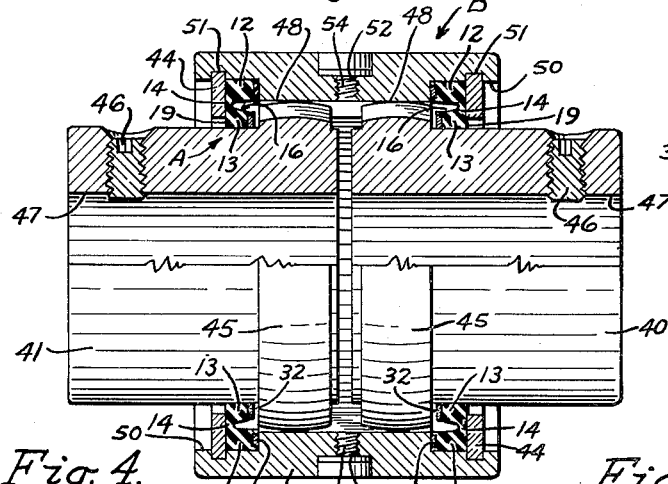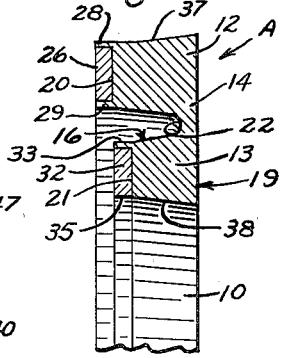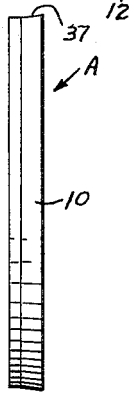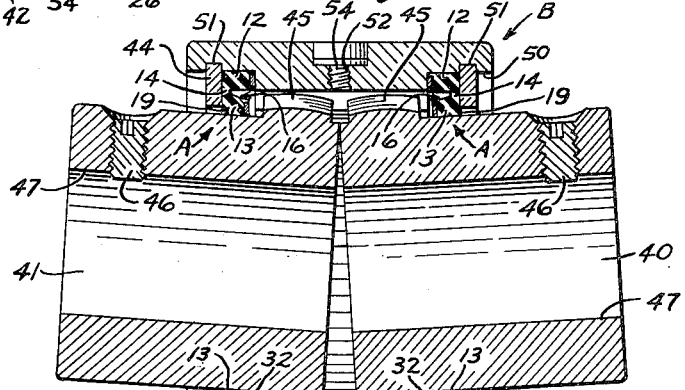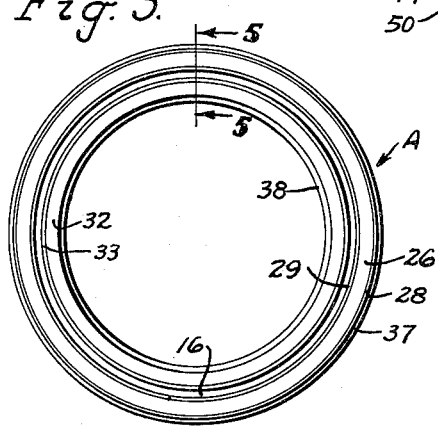
INVENTORS.
SAMUEL S. KAUFMAN
JAMES A. VARGAS
ATTORNEYS

United States Patent Office 2,974,501
Patented Mar. 14, 1961

SEALING RINGS

Samuel S. Kaufman, Paramus, and James A. Vargas, Union City, N.J., assignors to Sier-Bath Gear & Pump Co., Inc., North Bergen, N.J., a corporation of New Jersey Filed Nov. 9, 1959, Ser. No. 851,744

9 Claims. (Cl. 64—9)

This invention relates to improvements in sealing rings and more particularly to improvements in sealing rings for use in connection with self-aligning gear type flexible shaft couplings.

The primary object of this invention is the provision of a sealing ring for a rotary gear type self-aligning shaft coupling, which sealing ring will maintain its sealing action and compensate for extreme angular and/or parallel displacement of the mating members of the coupling while the seal is rotating with the mating members.

A further object is the provision of a sealing ring having an enlarged body portion at one end thereof and tapering to a smaller body portion at the other end thereof, the smaller body portion being provided to interfit within a seating cavity and serve to guide the sealing ring into its proper position during assembly of the elements with which the sealing ring is to be used, the enlarged body portion forming a superior pressurized gripping and sealing relationship, with the tapering thereof from the smaller to the larger body portion permitting a gradual increase of sealing and gripping pressure during the assembly thereof.

A further object is the provision of a torsionally resilient sealing ring having an outer and inner resilient ring-like body portion, the two portions being interconnected by a relatively thin resilient interconnecting body portion, with a groove spacing the inner portion from the outer portion; the thin resilient portion serving as a pivot to allow the outer portion to move relative to the inner portion during distortion of the sealing ring, such as may occur when the same is used in flexible couplings.

A further object is the provision of a sealing ring having an outer resilient ring-like body portion and an inner resilient ring-like body portion, with a relatively thin resilient interconnecting body portion interconnecting the inner portion and the outer portion, a groove being provided to space apart the inner and outer portions, which groove is designed to receive the grease or oil that is being sealed, so that upon rotation of the sealing ring and the members with which it is to be associated, the grease or oil tending to escape will enter the groove and the centrifugal force acting on the grease or oil within this groove will force the outer resilient ring-like body portion outwardly, in a seal expanding relationship, thereby improving the sealing and gripping relationship.

A further object is the provision of a sealing ring having an outer resilient ring-like body portion, an inner resilient ring-like body portion, and a relatively thin resilient body portion interconnecting the outer body portion and the inner body portion, one side of both the inner body portion and the outer body portion being provided with a metallic reinforcing ring. The metal reinforcing rings being positioned so that relative gouging or abrasive action of the member with which the sealing ring is to be used will come in contact with these reinforcing rings, which reinforcing rings will withstand thrust loads, abrasion and gouging. The metal reinforcing rings, when placed upon a normally resilient seal, will also serve to maintain the sealing ring in its proper sealing relationship against any forces that may be exerted thereupon, such as a centrifugal force which, in the normal resilient seal, might tend to force the entire resilient member outwardly, breaking the seal.

Other objects and advantages of this invention will be apparent during the course of the following detailed description, taken in connection with the accompanying drawing, forming a portion of this specification, and in which drawing:

Fig. 1 is a fragmentary sectional view taken through a flexible shaft coupling of the self-aligning gear type, showing our improved sealing ring employed therein.

Fig. 2 is a transverse sectional view similar to Fig. 1, but showing the mating hub members of the gear type flexible gear type coupling in a condition of misalignment.

Fig. 3 is an elevational view of one end of our sealing ring.

Fig. 4 is a side elevation of the sealing ring.

Fig. 5 is an enlarged cross sectional view taken substantially on the line 5—5 of Fig. 3.

In the drawing, wherein for the purpose of illustration is shown a preferred embodiment of the invention, and wherein similar reference characters designate corresponding parts throughout the several views, the letter A may generally designate our improved sealing ring and the letter B a flexible shaft coupling of the self-aligning gear type with which our improved sealing ring A may be used.

Our improved sealing ring A preferably comprises a resilient main body portion 10 having an outer resilient ring-like body portion 12 and an inner resilient ring-like body portion 13, the body portions 12 and 13 being interconnected by a resilient intermediate body portion 14 having less thickness than either the outer ring-like body portion 12 or the inner ring-like body portion 13, providing a distortable torsionally resilient interconnection between the outer and inner ring-like body portions so that they may be torsionally deflected with respect to each other. The outer resilient ring-like body portion 12 and the inner ring-like body portion 13 are preferably spaced apart at one end thereof, opposite the inner connecting resilient body portion 14, by a groove 16. This spacing apart of the outer and inner resilient ring-like body portions permits the spaced apart ends thereof to move inwardly or outwardly toward each other about the resilient interconnecting body portion 14, so that this interconnecting body portion 14 will serve substantially as a pivotal axis for movement of the inner and outer ring-like body portions thereabout. The outer ring-like body portion 12 is preferably of slightly greater thickness than the ring-like body portion 13, with one end of both the inner and outer ring-like body portions and the interconnecting body portion 14 terminating in the same plane 19, so that the opposite end 20 of the outer portion, 21 of the inner portion and 22 of the interconnecting portion present a somewhat stepped face with the end surface 20 of the outer ring-like body portion extending beyond the corresponding face 21 of the inner ring-like body portion 13, and the face 21 of the inner ring-like portion 13 extending beyond the corresponding face 22 of the inner connecting body portion 14. Such stepped construction is provided so that the outer resilient ring-like body portion will bear the force of any thrust loads, abrasion or gouging.

Mounted upon the face 20 of the outer ring-like body portion 12 is an outer reinforcing ring 26. This reinforcing ring is preferably of an extremely hard metal, such as steel, inasmuch as this reinforcing ring will bear the main portion of any abrasive or gouging forces that will be exerted upon the sealing ring. In order to securely fasten the outer reinforcing ring 26 to the face 20 of the resilient ring-like body portion 12, the same is bonded to the body portion at three sides thereof, one surface thereof being bonded to the face 20, with thin extensions 28 and 29 of the ring-like body portion 12 being provided to bond the outer and inner side edges of the reinforcing ring to the main body portion 12.

Bonded to the face 21 of the inner resilient ring-like body portion 13 is an inner reinforcing ring 32. This reinforcing ring is bonded to the face 21, and a thin extension 33 of the main body portion 13, is provided to bond the outer diameter of the reinforcing ring 32 to the body portion 13. The inner diameter 35 of the reinforcing ring 23 is not bonded.

The outermost and innermost diameters of the ring-like body portions 12 and 13, respectively, are tapered as at 37 and 38, providing a ring that is relatively wider at the face 19 thereof than at the faces 20, 21 and 22. The thin portion 28 of the body portion 12 forms an outer diameter that is substantially in a plane parallel to the axis of the ring, and the inner diameter 35 of the inner reinforcing ring 32 likewise is in a plane substantially parallel to the axis of the ring. There is thus provided, on both the outermost and innermost diameters of the ring, a portion substantially parallel to the axis of the ring, which portion will serve as a guide in the assemblage of the sealing ring with the other apparatus, and the tapered edges 37 and 38 will be required to be compressed in order to interfit within the structure receiving the ring, the resilient body portion 10 thereby being somewhat compressed and exerting a force to each side of the cavity receiving the ring, providing an increased gripping and sealing action.

It is to be understood that our sealing ring may be utilized in association with any assemblage wherein such a ring is required, however, the same has been primarily designed for use in a flexible shaft coupling of the self-aligning gear type. It has therefore been shown in the drawings in association with such assembly.

The flexible shaft coupling B preferably includes complementary shaft hub members 40 and 41 and a unitary sleeve member 42 with retaining rings 44 for maintaining the sealing ring A in place and cooperating with the shaft hub members to maintain the coupling elements assembled and providing a lubricant sealed type casing.

The shaft hub members 40 and 41 each comprise a cylindrical collar formed with inner flanged gear teeth 45, with the other end thereof having a threaded bore and a set screw 46 projecting therethrough into the inner shaft engaging cylindrical bores 47 of the hubs, which bores 47 are of a diameter corresponding with and for snugly engaging the shaft end upon which the hub is to be mounted and retained by the set screw 46.

The sleeve member 42 is provided with internal gear teeth 48 which extend longitudinally a distance sufficient for engagement with the gear teeth 45 of both hubs 40 and 41 and for permitting angular displacement of the hubs and the shafts carrying them as illustrated in Fig. 2. The sleeve 42 is provided to each side of the teeth 48, with sealing ring receiving grooves 50 and retaining ring receiving grooves 51 of a greater diameter than the grooves 50, for receiving the retaining rings 44. Openings 52 may be provided diametrically about the sleeve 42 for receiving a lubricant, and oil plugs 54 may be provided interfitting therewithin to seal the lubricant within the casing.

In the assemblage of the coupling, it will be obvious that the hub members 40 and 41 are inserted within the sleeve member 42 so that the teeth 45 are in engagement with the teeth 48, the sealing rings A inserted within the grooves 50 and the retaining rings 44 then snapped into place in the grooves 51, the retaining rings 44 holding the coupling assembled and the sealing rings in position.

It will be observed that in the assemblage of this coupling the sealing ring is placed so that the reinforcing rings 26 and 32 are facing toward the gear teeth, with the end surface 19 thereof in abutment with the retaining rings 44. In this assembled relationship, the outer reinforcing ring 26 will bear the brunt of any thrust loads, abrasion or gouging, with the inner reinforcing ring 32 serving mainly to retain the resilient body portion 13 in contact with its hub portion so that the same will not become displaced therefrom by centrifugal force during the rotation of the coupling. Upon rotation of the coupling some of the lubricant will be forced to within the groove 16, and the centrifugal force exerted upon the lubricant will serve to more firmly seal the ring in place. It will be seen that the spacing between the groove 50 of the sleeve member 42 and the outer diameter of the hubs 40 and 41 is such that the outer and inner diametrical portions of the sealing ring that are in a plane substantially parallel to the axis of the ring, the portions 28 and 35, respectively, will just fit within the opening therebetween. Thus, upon insertion of the sealing ring therewithin, the tapered portions thereof, 37 and 38, will be required to be compressed, so that a superior sealing and gripping action is provided.

In conditions of severe misalignment, such as illustrated in Fig. 2, the outer and inner ring-like body portions 12 and 13 will become distorted with respect to each other, about the interconnecting body portion 14, however, the ring will still maintain its sealing action. In such condition of severe misalignment, the inner reinforcing ring 32 may be brought to bear against the teeth 45 of the hubs 40 and 41, which reinforcing ring will then serve to contact the gear teeth 45 so that any abrasive or gouging characteristics will be borne by the reinforcing ring, rather than the resilient body portion.

In the drawing it has been necessary to somewhat exaggerate the thin extensions of the resilient body portion 10, namely the portions 28, 29 and 33, in order to properly illustrate the same. In actual practice, these portions will only be of sufficient thickness to firmly bond the sides of the reinforcing rings adjacent thereto to the resilient body portion 10, so that these portions will not bear any of the abrasive or gouging forces, although it might appear as if they did from the exaggerated showing in the drawing.

Although the sealing characteristics of our improved sealing ring have been mainly specified, it will be seen that this ring, in its association with both the sleeve 42 and the hubs 40 and 41, will serve as a buffer reacting against sharp torques or misaligning stresses that may be applied to the coupling.

Various changes in the shape, size and arrangement of parts may be made to the form of invention herein shown and described without departing from the spirit of the invention or the scope of the following claims.

We claim:

1. As an article of manufacture, a flexible sealing ring having a body portion including an outer ring-like body portion of substantial transverse area, an inner ring-like body portion of substantial transverse area, and an intermediate body portion of substantially less transverse area than either of said inner and outer ring-like body portions interconnecting said outer and inner ring-like body portions; each of said body portions having a common planar base face with said inner and outer ring-like body portions having a second face spaced from and parallel to said base face; said inner and outer ring-like body portions being spaced from each other adjacent said intermediate body portion and defining a groove in said body portion, with said intermediate body portion forming a pivotal interconnection for flexing of said outer and inner ring-like body portions thereabout; a reinforcing ring mounted upon said second face of said outer ring-like body portion, adjacent said groove; and a reinforcing ring mounted upon said second face of said inner ring-like body portion, adjacent said groove.

2. A sealing ring as specified in claim 1 wherein the innermost side edge of the reinforcing ring applied to the inner ring-like body portion extends to the innermost diameter of said second face of the inner ring-like body portion, forming an anchor for the innermost diameter of the inner ring-like body portion against displacement thereof by centrifugal force upon rotation of the sealing ring.

3. As an article of manufacture, a flexible sealing ring having a body portion including an outer ring-like body portion of substantially transverse area, an inner ring-like body portion of substantial transverse area, and an intermediate body portion of substantially less transverse area than either of said inner and outer ring-like body portions interconnecting said outer and inner ring-like body portions; each of said body portions having a common planar base face with said inner and outer ring-like body portions having a second face spaced from and parallel to said base face; said inner and outer ring-like body portions being spaced from each other adjacent said intermediate body portion and defining a groove in said body portion, with said intermediate body portion forming a pivotal interconnection for flexing of said outer and inner ring-like body portions thereabout, the outermost diameter of said outer ring-like body portion and the innermost diameter of said inner ring-like body portion being tapered in divergent relationship said second face thereof toward said common planar base face, providing a body portion having a greater thickness at said common planar base face than at said second face.

4. A sealing ring having a resilient body portion including a resilient outer ring-like body portion of substantial transverse area, a resilient inner ring-like body portion of substantial transverse area, and a resilient intermediate body portion of substantially less transverse area than either of said inner and outer ring-like body portions interconnecting said outer and inner ring-like body portions; each of said body portions having a common planar base face with said inner and outer ring-like body portions having a second face spaced from and parallel to said base face; said inner and outer ring-like body portions being spaced from each other adjacent said intermediate body portion and defining a groove in said body portion, with said intermediate body portion forming a pivotal interconnection for flexing of said outer and inner ring-like body portions thereabout; a reinforcing ring mounted upon said second face of said resilient outer ring-like body portion, adjacent said groove; and a reinforcing ring mounted upon said second face of said inner ring-like body portion, adjacent said groove; said reinforcing rings having a degree of tensile strength and hardness substantially greater than said resilient body portion.

5. A sealing ring having a resilient rubber-like body portion including a resilient rubber-like outer ring-like body portion of substantial transverse area, a resilient rubber-like inner ring-like body portion of substantial transverse area and a resilient rubber-like intermediate body portion of substantially less transverse area than either of said inner and outer ring-like body portions interconnecting said outer and inner ring-like body portions; each of said body portions having a common planar base face with said inner and outer ring-like body portions having a second face spaced from and parallel to said base face; said inner and outer ring-like body portions being spaced from each other adjacent said intermediate body portion and defining a groove in said body portion, with said intermediate body portion forming a pivotal interconnection for flexing of said outer and inner ring-like body portions thereabout; a metal reinforcing ring mounted upon said second face of said outer ring-like body portion, adjacent said groove; and a metal reinforcing ring mounted upon said second face of said inner ring-like body portion, adjacent said groove.

6. In a flexible shaft coupling of the self-aligning gear type, having a pair of complementary shaft end hubs, each having a collar with gear teeth on the adjacent ends of the hubs, a cylindrical sleeve having internal gear teeth extending lengthwise over and in engagement with the gear teeth on both the hubs, sealing ring annular channels provided in the ends of the sleeve, and retaining rings for retaining a sealing ring in each of the annular channels; a sealing ring mounted within each of said sealing ring annular channels comprising a body portion including an outer ring-like body portion of substantial transverse area, an inner ring-like body portion of substantial transverse area, and an intermediate body portion of substantially less transverse area than either of said inner and outer ring-like body portions interconnecting said inner and outer ring-like body portions; said inner and outer ring-like body portions being spaced from each other adjacent said intermediate body portion and defining a groove in said body portion, with said intermediate body portion forming a pivotal interconnection for torsional flexing of said outer and inner ring-like body portions thereabout, one end face of said outer ring-like body portion extending beyond the corresponding end face of said inner ring-like body portion; and a reinforcing ring having substantially greater hardness and tensile strength than said body portion mounted upon the said face of said outer ring-like body portion extending beyond the corresponding face of said inner ring-like body portion, said reinforcing ring of said outer ring-like body portion extending within said flexible coupling to a point adjacent the intermeshing of the teeth of said hubs with said sleeve, providing a substantially wear resistant surface that will absorb thrust and abrasive or gouging effects of said coupling that may be exerted upon said sealing ring.

7. A sealing ring as specified in claim 6 wherein a reinforcing ring having substantially greater hardness and tensile strength than said body portion is mounted upon said corresponding face of said inner ring-like body portion, the interior diameter of said last mentioned reinforcing ring being substantially the same as the outer diameter of said shaft end hubs.

8. A sealing ring as specified in claim 2 wherein said reinforcing rings mounted upon said respective faces of said inner and outer ring-like body portions are parallel to said common planar base face of said body portions.

9. As an article of manufacture, a flexible sealing ring having a body portion including an outer ring-like body portion of substantial transverse area, an inner ring-like body portion of substantial transverse area, and an intermediate body portion of substantially less transverse area than either of said inner and outer ring-like body portions interconnecting said outer and inner ring-like body portions; said inner and outer ring-like body portions being spaced from each other adjacent said intermediate body portion and defining a groove in said body portion, with said intermediate body portion forming a pivotal interconnection for flexing of said outer and inner ring-like body portions thereabout; a reinforcing ring mounted upon one face of said outer ring-like body portion, adjacent said groove; and a reinforcing ring mounted upon the corresponding face of said inner ring-like body portion, adjacent said groove, the innermost side edge of the reinforcing ring applied to the inner ring-like body portion extending to the innermost diameter of one end face of the inner ring-like body portion, forming an anchor for the innermost diameter of the inner ring-like body portion against displacement thereof by centrifugal force upon rotation of the sealing ring, with the leading edge of the outermost diameter of the outer ring-like portion and the innermost diameter of the inner ring-like body portion, at the end of said body portion having the least thickness, being provided with portions substantially parallel to the axial center of the sealing ring, forming a guide for the insertion of the enlarged end of the body portion to within a receiving cavity.

References Cited in the file of this patent

UNITED STATES PATENTS

| | | |
|---|---|---|
| 2,093,572 | Padgett | Sept. 21, 1937 |
| 2,387,182 | Procter | Oct. 16, 1945 |
| 2,415,888 | Joy | Feb. 18, 1947 |
| 2,650,117 | Chambers et al. | Aug. 25, 1953 |
| 2,773,367 | Slaght | Dec. 11, 1956 |
| 2,814,449 | Wieczorek | Nov. 26, 1957 |
| 2,841,966 | Belden et al. | July 8, 1958 |

UNITED STATES PATENT OFFICE
CERTIFICATION OF CORRECTION

Patent No. 2,974,501                      March 14, 1961

Samuel S. Kaufman et al.

It is hereby certified that error appears in the above numbered patent requiring correction and that the said Letters Patent should read as corrected below.

Column 6, line 53, for the claim reference numeral "2" read -- 1 --; column 7, line 5, before "portion" insert -- body --.

Signed and sealed this 25th day of July 1961.

(SEAL)
Attest:

ERNEST W. SWIDER                      DAVID L. LADD
Attesting Officer                      Commissioner of Patents